June 9, 1953 — F. L. WRIGHT — 2,641,373
BOAT TRAILER ASSEMBLY
Filed Nov. 2, 1950 — 3 Sheets-Sheet 1
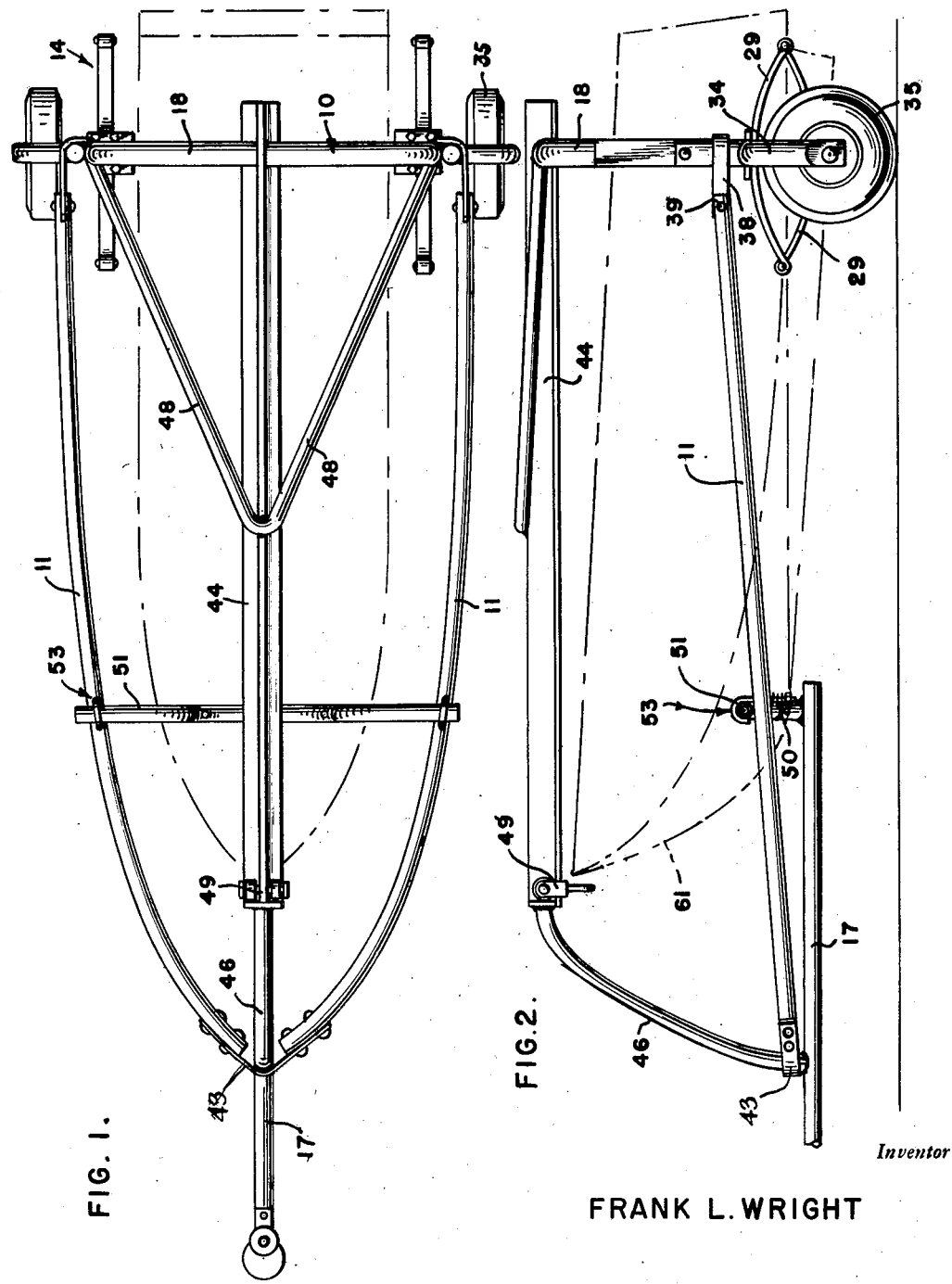
Inventor
FRANK L. WRIGHT June 9, 1953 F. L. WRIGHT 2,641,373
BOAT TRAILER ASSEMBLY
Filed Nov. 2, 1950 3 Sheets-Sheet 2

Inventor
FRANK L. WRIGHT

June 9, 1953 F. L. WRIGHT 2,641,373
BOAT TRAILER ASSEMBLY
Filed Nov. 2, 1950 3 Sheets-Sheet 3

FRANK L. WRIGHT

Patented June 9, 1953

2,641,373

UNITED STATES PATENT OFFICE 2,641,373

BOAT TRAILER ASSEMBLY

Frank L. Wright, Mayfield, Ky.

Application November 2, 1950, Serial No. 193,553

4 Claims. (Cl. 214—394)

My present invention relates to a trailer assembly, and more particularly is directed to a collapsible trailer, finding special use for transporting small boats, such as outboard hulls.

There are, of course, numerous trailers for accomplishing the desired ends currently in use, but the majority of these trailers are not entirely satisfactory, in that special fixtures or accessories must be incorporated with the boat structure for the successful use of the trailer.

Perhaps the principal purpose in employing a collapsible type trailer is to permit a boat to be loaded and unloaded without any strenuous effort on the part of the user in situations where the water body is only of sufficient depth to float the boat. However, the trailer of my invention may also be used for dry land loading and unloading, since the trailer requires but one person for its operation.

Viewing the invention broadly, it comprises a rigid light weight wheeled frame for carrying the boat, the frame being provided with a wheeled running gear which is pivotally mounted with respect to the frame, the wheeled running gear being operatively connected with the boat supporting members whereby movement of the boat supporting members relative to the frame moves the pivotally mounted wheels to enable the boat supporting members to be located at a height permitting the boat to be readily moved thereon, and further means to lock both the wheeled running gear and the boat supporting members in the load transporting position.

A further object of my invention is to provide a collapsible trailer for transporting small boats which includes few essential working parts which can be inexpensively manufactured and which may be efficiently operated by a single person.

Yet a further object of my invention is to provide a collapsible boat trailer wherein the running gear is positively locked to the rigid framework in the boat transporting position, thereby rendering the trailer a sturdy structure during travel along roads.

Still a further object of my invention is to provide a collapsible trailer for transporting small boats wherein the means for locking the running gear and the boat supporting members in the boat transporting position also aids in carrying the weight of the front of the boat.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a top plan view of the boat trailer, the boat being shown in broken lines.

Figure 2 is a side elevational view of the trailer shown in Figure 1, the trailer being illustrated in the boat transporting position.

Figure 4:
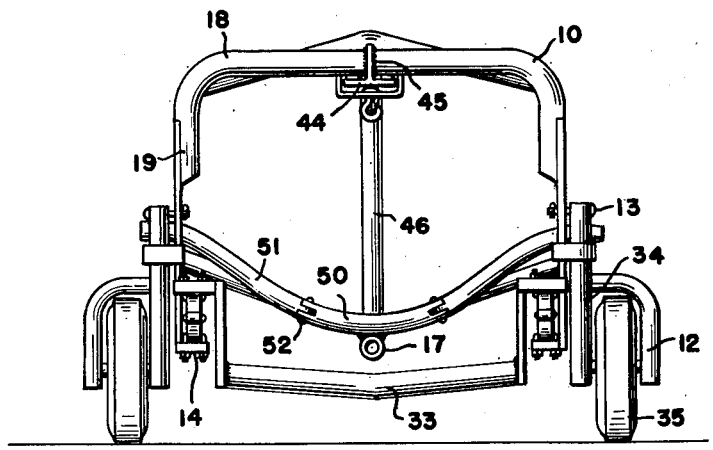
Figure 4 is a rear elevational view of the trailer as shown in Figure 2.

Referring to Figures 1 and 4, the trailer comprises a rear supporting member 10, side frame members 11, a pair of ground wheels 12 pivotally mounted to the rear supporting member 10, as indicated generally 13, a spring assembly 14 associated with the supporting member 10, a locking unit 15 for the side members 11 and the wheels 12, an overhead support 16 extending forwardly from the supporting member 10 and being connected at its free or outer end to a support 17 which also forms a part of a hitch or other connecting means whereby the trailer may be attached to a towing vehicle, such as an automobile (not shown).

Figure 6:
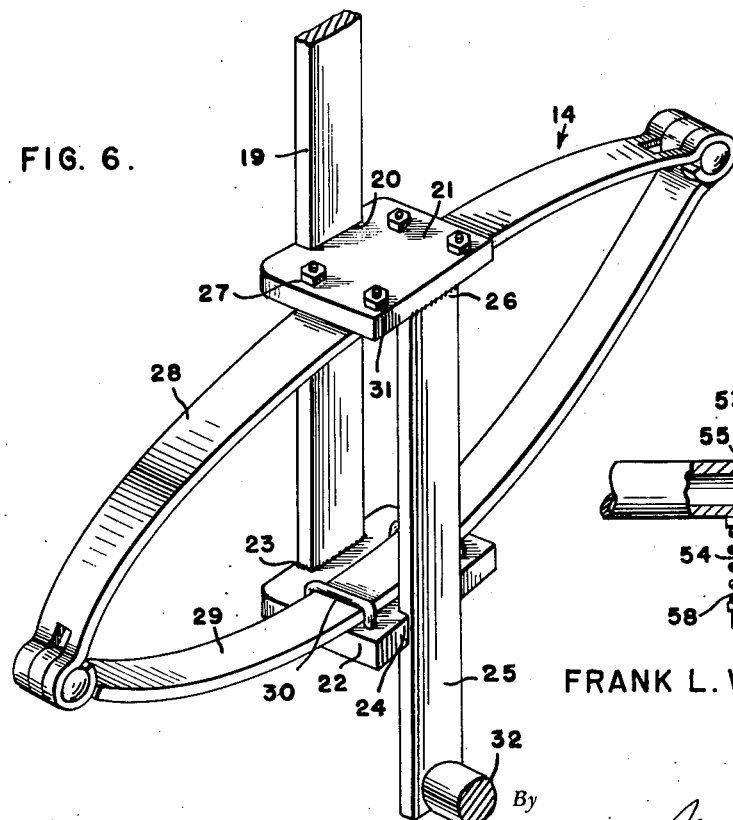
Figure 6 is a view in perspective of one of the spring mountings.

The rear supporting member 10 includes an upper substantially U-shaped tube 18, each leg of which is recessed on its outer face to receive a vertical strap or bar 19, the bar being welded or otherwise secured to the leg. The bar is fitted into a slot 20 formed in the outer face of a block 21, and the lower end of the bar is welded to a complemental block 22, as indicated at 23. The inner edge of the block 22 is slotted, as shown at 24, to receive a second vertical strap or bar 25, and the upper end of the bar 25 is welded, as at 26, to the lower face of the upper block 21. The blocks 21 and 22 are provided with pairs of spaced apertures 27 and, as shown in Figure 6, leaf spring members 28 and 29 of the spring assembly 14 are adapted to be in facial engagement with the blocks 21 and 22, respectively. U-bolt assemblies 30 encircle the leaf members 28 and 29, and the legs of the bolts extend through the apertures 27 in the blocks, and nuts 31 are threaded onto the legs whereby the leaf elements 28 and 29 are fastly secured to the blocks 21 and 22 and, as a consequence, carried by the rear supporting member 10.

A transversely extending rod 32 is welded to the inner face of each of the straps 25, and hence, it can be seen that the rear supporting member 10 is a substantially integral structure. The rod 32 preferably tapers to its midpoint, as denoted generally 33 to conform to the configuration of the boat bottom and, as will later be more fully described, serve to support the rear of the boat.

Figure 3:
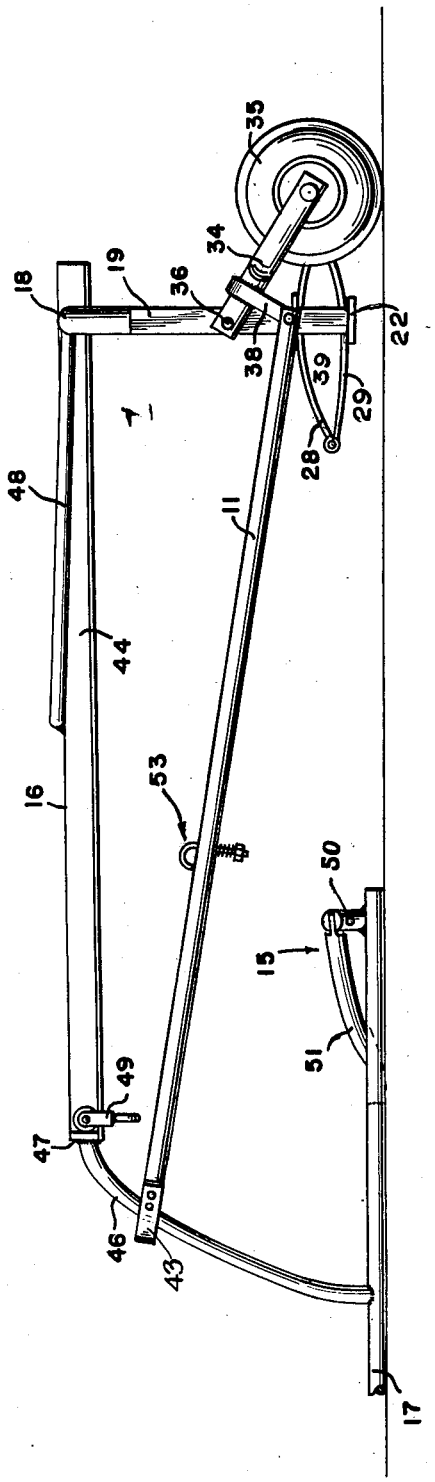
Figure 3 is a side elevational view depicting the parts in the boat loading position.
Figure 5:
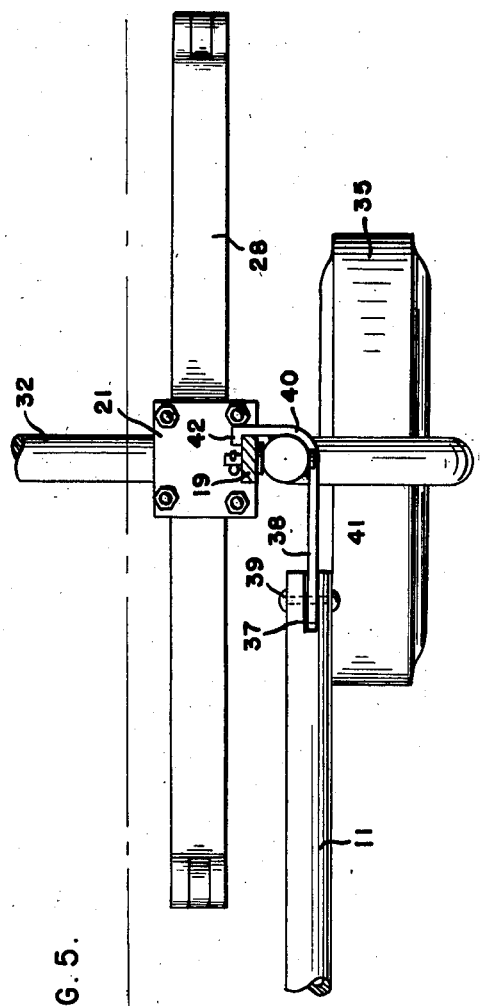
Figure 5 is a plan view, partly in section, and partly broken away, showing the spring mounting and the pivotal connection between one of the side members and its associated ground-engaging wheel.

Each ground wheel 12 comprises a tubular member 34, to the lower end of which a wheel 35 is journalled. The tubular member 34 may be bifurcated at the lower end and the wheel journalled within the bifurcation. The upper end of each tube 34 is pivoted to the vertical strap 19 by means of a bolt and cotter key unit 36 or some other desirable attaching device whereby the wheels may be swung rearwardly with respect to the rear supporting member 10 to permit the trailer to be lowered to the position shown in Figure 3. It will be noted that the rear end of each of the side members 11 is bifurcated, as shown at 37, and an arm 38 extends into the bifurcation and is pivotally connected to the side member by a rivet, nut and bolt device or the like 39. The opposite end of the arm 38 is bent, as shown at 40, to embrace the tube 34, the arm being welded or brazed to the tube, as indicated at 41. The free end of the bent portion 40 of the arm 38 terminates in a hook or projection 42 which engages the inner face of the strap 18 (see Figure 5). The connection between each side member 11 and each tube 34 will function to maintain the wheels 12 in the boat carrying position shown in Figure 2, or move the wheels about the pivot 36 to the boat loading position, as depicted in Figure 3.

The side members 11 curve inwardly toward their free ends and a catch or latch device 43 connects the ends of the side members.

The overhead support 16 includes a T-iron 44 the vertical flange of which is welded or otherwise conveniently secured to the U-shaped member 18, as indicated at 45, and an arcuate bar 46 is secured at one end to the outer extremity of the T-bar 44, as at 47, and the lower end of the bar is welded to the support 17 intermediate the ends of the support. The bar 44 may be strengthened or reinforced by diagonal braces 48 which extend from the U-shaped member 18 to the bar 44 at approximately the midpoint thereof. A wheeled trolley 49 is adapted to ride longitudinally of the bar 44 on the horizontal flange to facilitate the movement of the boat both onto and out of the trailer.

Figure 7:
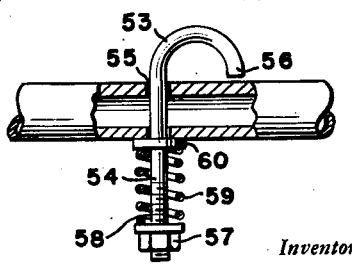
Figure 7 is a fragmentary view, partly in section, illustrating one of the locking hooks for the side frame member.

An arcuate arm 50 is welded adjacent the rear end of the support 17, and an upwardly curved extension 51 is pivotally attached to each end of the arm 50, as indicated at 52, for movement about a substantial vertical axis. As perhaps best shown in Figures 1 and 4, the extensions 51 are of such length as to project a short distance beyond each side member 11 when the extensions are moved to the position depicted in Figure 1. Each extension is adapted to be secured to its associated side member by means of a spring-operated hook device 53 permanently carried by the side member 11. With reference to Figure 7, it can be seen that each hook device 53 comprises a shank 54 which extends through alined openings 55 in the side member 11. The shank is formed with a hook 56 at one end, and a nut 57 engages threads 58 on the opposite end. A helical spring 59 is located between the nut 57 and a collar 60 on the shank, the spring tending to draw the hook 56 toward the side member 11. The tension of the spring can be regulated by adjusting the nut 57. Hence, it can be seen that with the extensions 51 secured to the side members 11, the side members 11 will be approximately horizontal and the clamp 43 engages the bar 46 at its junction with the support 17. The wheels 12 will be located in their vertical position and will be securely maintained in this position by virtue of the locking of the side members. When it is desired to load a boat such as indicated at 61 on the trailer, and assuming the boat to be in shallow water, the hooks 53 are disengaged from the extensions 51, whereupon the side members may be moved upwardly at their outer end along the arcuate bar 46. This upward movement of the arms and the attendant downward movement of the rear end of the side members will move the arm 38 downwardly, whereupon the projection 42 is moved away from the strap 19 and the tubes 34 and wheels 35 can move rearwardly about the pivots 36 to lower the rear supporting member 10. This, of course, will place the rod 32 below the bottom of the boat and the boat may be moved onto the trailer for support by the rod and the arm 50 and extensions 51. The trolley 49 is primarily used to carry the front end of the boat during loading on dry land, and the trolley may be fastened or secured to the boat in any suitable manner. If the user desires, the trolley can be employed for loading the boat onto the trailer. With the boat moved the necessary distance within the trailer, the side members 11 are moved downwardly until the clamp 43 engages the lowermost portion of the bar 46, after which the extensions 51 are then secured to the side members 11 by the hooks 53. Of course at the same time the tubes 34 are moved into parallelism with the straps 19 and the protuberances 42 will arrest the forward pivotal movement of the tubes when they engage the straps 19. The boat may then be moved completely within the trailer and the forward end will be supported by the arm 50 and extensions 51, while the rear of the boat rests on the bar 32. If necessary, suitable means may be employed to make the boat fast to the T-bar 44 to positively prevent any movement of the boat with regard to the trailer.

It will be appreciated that the trailer is effectively operated without the necessity of removing or detaching any part of the trailer structure and the movement of the various working parts is quite fast and convenient.

It is believed apparent, therefore, that I have provided a trailer assembly by means of which it is possible for one person to easily and quickly load or unload a small boat with a minimum of strenuous effort. While the foregoing description has been in connection with loading boats in the water, it is, of course, obvious that the trailer can be effectively employed on land. When the essential working parts of the trailer are in the boat transporting means, the movable parts are effectively locked and there is no danger of an accidental "collapsing" of the trailer during travel along the highways. The trailer can be inexpensively fabricated and maintenance costs can be kept at a minimum.

The invention is not to be confined to any strict conformity with the showing in the drawings, but may be changed or modified so long as such changes or modifications mark no material departure from the salient features of the invention as expressed in the appended claims.

I claim:

1. A trailer for transporting small boats comprising a substantially rectangular rear frame member, a pair of ground-engaging wheels pivotally connected to the sides of the rear frame member for movement about the horizontal axis, a pair of side members, an arm secured at one end to each wheel, a pivot connection between the opposite end of each arm and each side member whereby the side members are pivotally secured to the ground-engaging wheels at a point below the pivot of the wheels to the rear frame member and extending forwardly of the rear frame member, so that when the pivot between the side members and the wheels is unbroken the wheels are in alinement with the sides of the rear frame member and at approximately right angles to the side members, a protuberance on each arm for engaging the side of the rear frame member to maintain each wheel in alinement with the side of the rear frame member when the pivot between the side member and the wheel is unbroken, means connecting the free ends of the side members, and transversely extending means operatively connected to the side members intermediate the ends thereof cooperating with the rear frame member to support the boat, the ground-engaging wheels being adapted to be moved about their pivots to the rear frame member to lower the rear frame member to facilitate loading the boat when the side members are moved to break the pivots between the side members and the ground-engaging wheels.

2. A trailer for transporting boats as claimed in claim 1 wherein a spring assembly is operatively connected with each of the sides of the rear frame member and the ground-engaging wheels.

3. A trailer for transporting small boats as claimed in claim 1 wherein a trackway is secured to the rear frame member and extends forwardly therefrom, a towing rod located beneath the trackway, means connecting the trackway and the towing rod to maintain the trackway and towing rod in parallel relation, and a trolley movable along the trackway adapted to be connected to the boat to facilitate the movement of the boat onto the trailer.

4. A trailer for transporting small boats as claimed in claim 3 wherein a pair of arms are pivotally connected to the towing rod, the arms being adapted to be moved to a position bridging the gap between the side members to form the transversely extending means connected to the side members, and latching means on each of said side members embracing the said arms for securing the arms to the side members.

FRANK L. WRIGHT.

References Cited in the file of this patent

UNITED STATES PATENTS

| Number | Name | Date |
|---|---|---|
| 2,478,795 | Whalen et al. | Aug. 9, 1949 |
| 2,487,701 | Getz | Nov. 8, 1949 |
| 2,496,599 | Rivers | Feb. 7, 1950 |
| 2,502,309 | Byrd, J. D. | Mar. 28, 1950 |
| 2,506,699 | Byrd, J. W. | May 9, 1950 |
| 2,536,563 | Montgomery | Jan. 2, 1951 |
| 2,562,596 | Bonfietti | July 31, 1951 |
| 2,577,246 | Hill | Dec. 4, 1951 |